United States Patent [19]

Kurtin et al.

[11] Patent Number: 4,972,270
[45] Date of Patent: Nov. 20, 1990

[54] FACSIMILE RECORDER WITH ACUTELY MOUNTED STAGGERED ARRAY INK JET PRINTHEAD

[76] Inventors: Stephen Kurtin, 3835 Kingswood Rd.; Saul Epstein, 14558 Deervale Pl., both of Sherman Oaks, Calif. 91403

[21] Appl. No.: 338,330

[22] Filed: Apr. 17, 1989

[51] Int. Cl.⁵ .................... H04N 1/034; G01D 15/18; B41J 2/05; B41J 2/15
[52] U.S. Cl. ............................... 358/296; 346/140 R; 346/1.1; 400/126
[58] Field of Search .................... 358/296; 346/140 R, 346/75, 139 R; 400/124 IV, 126

[56] References Cited

U.S. PATENT DOCUMENTS 4,367,480  1/1983  Kotoh ............................. 346/140 R

FOREIGN PATENT DOCUMENTS 0031421  7/1981  European Pat. Off. ...... 400/124 IV
0055761  3/1984  Japan ............................. 400/124 IV Primary Examiner—Bruce A. Reynolds
Assistant Examiner—Scott A. Rogers
Attorney, Agent, or Firm—Saul Epstein

[57] ABSTRACT

A method and system for reproducing facsimile images or other images in a dot matrix format wherein the normal printhead line resolution is not the same as the image line resolution. Two embodiments are disclosed. In the preferred embodiment, a commercially available printhead having two columns of dot forming elements is used. The printhead is slanted so as to change the effective spacing of the dot forming elements, and the dots making up the image are formed by the two columns alternately so as to increase the speed of operation. In the second embodiment disclosed, each of the scan lines of the image is comprised of dots formed by three dot forming elements. Each picture element is printed by two of the three dot forming elements and no two adjacent picture elements are printed by the same group of two.

9 Claims, 4 Drawing Sheets

FACSIMILE RECORDER WITH ACUTELY MOUNTED STAGGERED ARRAY INK JET PRINTHEAD

BACKGROUND OF THE INVENTION

1. Field of the Invention

This invention relates to the field of dot matrix printing, with particular reference to creating dot matrix images corresponding to CCITT standard facsimile signals.

2. Prior Art

In recent years, facsimile machines (telecopiers) have become very popular for transmitting graphic information from one place to another. These machines are used to transmit images over the public switched telephone network and are popularly called FAX machines. A FAX transmission can be made as simply as a telephone call, using a FAX machine at each end of the line instead of a telephone instrument. Within each FAX machine are means for producing electrical signals representative of an image to be transmitted, and for coupling these signals to a telephone system, either public or private. Also within each machine is a receiver for receiving FAX signals and for reconstructing an original image in printed form. The present invention is primarily concerned with the printing of images reconstructed from received FAX signals. While the invention has particular application to printing FAX images, and will be described in that context, it will be apparent to those skilled in the art that there are also other applications for the invention as defined by the claims appended hereto.

In order to facilitate FAX communications between large numbers of users, an international organization, The International Telephone and Telegraph Consultative Committee (CCITT), has defined certain standards to be utilized by users of FAX to communicate with other users. These standards are intended to permit communication between machines made by different manufacturers and located in different countries. The CCITT has adopted compatibility standards covering the transmission and reception of FAX signals according to four speed/quality groups: Groups 1, 2, 3, and 4. The vast majority of FAX signals today are sent and received according to the Group 3 compatibility standard. This standard is known as CCITT Recommendation T.4. It was last amended in 1984. Groups 1 and 2 are earlier standards and are relatively slow, while group 4 requires a special high quality telephone line and has not yet gained popularity. The present invention is therefore described in connection with the Group 3 standard. It should be understood, however, that its applicability is not necessarily limited to Group 3 communications.

FAX transmission starts by scanning an original page in raster fashion. The variations of print density on the page are converted into a digital video signal which is subsequently coded for efficient transmission. This coded signal is modulated on an audio carrier and sent over a telephone network. At a remote terminal the signal is received, demodulated, decoded and used to cause a printing device to print an image corresponding to the original.

There are two modes of transmission defined by the CCITT Group 3 standard, standard mode and fine mode. The fine mode raster has a resolution of 7.7 lines per mm (195.6 lines per inch) vertically, with each line including 1728 picture elements ("pels") along a standard 215 mm scan line, i.e., 204 pels per inch horizontally. Each fine mode pel therefore represents a small rectangular area about 5 mils square (1 mil=0.001 inch). The standard mode raster has half the vertical resolution of the fine mode (3.85 lines per mm), but the same horizontal resolution (i.e., 97.8V×204H picture elements per inch). A standard mode pel is thus about 10 mils high by about 5 mils wide. According to the CCITT Recommendation T.4, the nominal pel sizes as defined should be maintained within plus or minus one percent.

The printing mechanism of most prior art FAX receivers uses a thermal printhead which is essentially a linear array of resistors, each of which produces heat in response to received electrical signals. By passing thermally sensitive paper over the printhead while the received signals are causing the print elements of the printhead to be heated, dark spots corresponding to the dark picture elements of the original copy are formed. The totality of the dark spots formed during the transmission of a FAX image is intended to be a copy of the original image.

An important disadvantage of the system as described above is the necessity to use special thermally sensitive paper on which the received image is formed. Not only is thermally sensitive paper expensive, but its handling and surface characteristics are such that most people find it to be undesirable. It is therefore an object of the present invention to provide a FAX machine which will receive CCITT standard FAX signals, but will print an image on plain paper rather than on thermally sensitive paper as used in the prior art.

There are some FAX machines presently available which include printers that print on plain paper. These machines, however, utilize xerographic or thermal transfer processes and are relatively expensive.

Ink jet processes have been considered by some in the past for printing FAX images but, generally speaking, ink jet printing has been thought to be impractical because it is typically unreliable and also slow. It is therefore a further object of the present invention to provide a reliable FAX system which can produce images as rapidly as the thermal systems now in use.

SUMMARY OF THE INVENTION

The presently preferred embodiment of this invention utilizes a commercially available cartridge type ink jet printhead (the Hewlett-Packard DeskJet print cartridge) which obviates the reliability problems of prior art. This cartridge, manufactured by the Hewlett-Packard Company for use in its DeskJet printer, is well known in the art and is widely used in computer printing applications. This cartridge has not previously been considered for use as a printhead in a FAX receiver because it is designed to have a 300V×300H dot per inch (DPI) printing matrix, whereas CCITT Group 3 FAX standards involve a 97.8V×204H DPI matrix in standard mode and 195.6V×204H DPI matrix in fine mode. No ink jet cartridge designed to be able to print images in accordance with CCITT FAX standards has been yet marketed. As will be described below, using the principles of the present invention the CCITT standard line and dot spacings can be obtained using a cartridge which was designed with other spacings in mind. One might mistakenly think that no problem exists, since it is technologically feasible to design and produce an ink jet print cartridge similar to the Hewlett-Packard DeskJet print cartridge, but with inherent line spacings in accordance with the CCITT FAX standards. A problem does exist, however, because only one version of the DeskJet print cartridge is available from Hewlett-Packard and very few, if any, other companies have the ability to make such a cartridge. In any event, none has. Hence, a person wishing to utilize available ink jet components in a FAX receiver does not have the option of using a DeskJet type print cartridge designed to print 97.8 and 195.6 lines per inch; he must use a cartridge made to produce 300 lines per inch images or none at all.

The Hewlett-Packard DeskJet cartridge includes 50 ink jet nozzles arranged in two columns spaced 1/30 inch apart (33.33 mils) horizontally, i.e., in the direction of a printed line on a page. The vertical spacing of the nozzles in each column is 1/150 inch (6.67 mils) with the nozzles in the second column being offset (vertically) one half space with respect to the nozzles of the first column. Droplets of ink are ejected from the nozzles and onto a sheet of paper in response to electrical pulses applied to resistive firing elements (ejectors) located in chambers behind the nozzles. Each droplet results in a printed dot about 4 to 5 mils in diameter. As used in its intended application, the head produces a swath 50 dots (1/6 inch) high as it is moved across the sheet. In order to produce a complete image, the head is scanned repeatedly across the page, the paper typically being moved vertically 1/6 inch after each scan. By selectively firing the nozzles as the head moves across the page, any desired pattern can be produced on the paper.

The mechanical spacing of the nozzles results in a 300 DPI vertical resolution on the printed page. In its intended application, the head is scanned across the page at a rate which results in a 300 DPI horizontal resolution. The nozzles have a maximum firing rate of about 3600 times per second so that a single scan across an 8.5 inch page takes about 0.7 seconds. Hence a full 8.5×11 inch page can be scanned in about 46 seconds. Not only is this slower than is desirable for printing FAX images, but the resulting dot matrix does not even approximate that used in FAX transmissions. The present invention causes the inherent 300×300 DPI dot matrix printed by the Hewlett-Packard DeskJet print cartridge to be altered to either exactly or approximately match the CCITT compatibility standards. This alteration is accomplished in one of two ways, (i) by mounting the printhead at an angle so as to change the effective nozzle spacings, or (ii) by selective firing of the ejectors.

It is possible to use the Hewlett-Packard DeskJet print cartridge to print an image approximately in accordance with CCITT standards with the cartridge mounted square with respect to the paper motion. Although such an image will not literally meet the CCITT standards, it may be satisfactory for some purposes. A standard mode FAX image can be formed with a squarely mounted printhead, for example, by reproducing each pel of the original image using three vertically aligned dots from three adjacent rows of nozzles, and at the same time causing the horizontal dot spacing to be about 208 DPI. A image which is about 2% smaller than the original copy, but otherwise satisfactory, can be made in this fashion; but, unfortunately, the maximum allowable firing rate of the printhead ejectors is such that this image cannot be generated as rapidly as is commercially necessary. In order to achieve a commercially adequate printing speed it is necessary that no nozzle be required to form dots spaced as closely as one pel width. But if pels are skipped, the dot density of the black areas of the image drops so that the image becomes noticeably gray. In fine mode, skipping pels also results in loss of image detail. Prior to the present invention there was no way to produce an acceptable image which includes all of the image detail (particularly in fine mode) and at the same time achieve a commercially adequate speed.

Despite the dichotomy described in the previous paragraph, the present inventors have devised a printing pattern utilizing a squarely mounted printhead which does not suffer from the aforementioned disadvantages. The pattern devised provides a dot density of two dots per pel in standard mode and one dot per pel in fine mode, thus achieving an acceptable level of image "blackness" an reproducing all of the received image detail. Further, since this pattern does not require any nozzle to be fired more often than once every 1.5 pels, the speed of printing can be made sufficiently fast to satisfy commercial requirements.

In another embodiment of the invention (the presently preferred embodiment), the printhead is not aligned with the direction of printhead motion as was contemplated by its designers, but rather, the head is turned so that the nozzle columns make an angle of about 50 degrees with respect to the direction of printhead motion When the head is at this angle, the spacing of the nozzles in each column in the direction of paper motion is 5.11 mils (195.6 DPI), i.e., the CCITT Group 3 specified fine mode line spacing. In order to provide the Group 3 CCITT standard horizontal dot spacing of 204 DPI, the scan speed of the printhead is increased as compared to the speed used to obtain 300 DPI. In this embodiment, a CCITT Group 3 standard mode vertical resolution of 97.8 DPI may be obtained by reproducing each pel of the image using two vertically aligned dots created by two adjacent nozzles, or alternatively, each standard mode pel can be printed with a single dot using only alternate nozzles down the columns. This latter method results in a grayer image but, on the other hand, it consumes less ink, which could be desirable in some cases.

While the general principles of the present invention have been summarized above, a more complete understanding may be had by reference to the detailed description of the embodiments of the invention set out below, taken together with the appended figures which illustrate the features of the invention.

BRIEF DESCRIPTION OF THE FIGURES

FIG. 8 is a depiction of a line four dots high as would be printed by a printhead positioned as shown in FIG. 7.

DETAILED DESCRIPTION OF THE INVENTION

Figure 1:
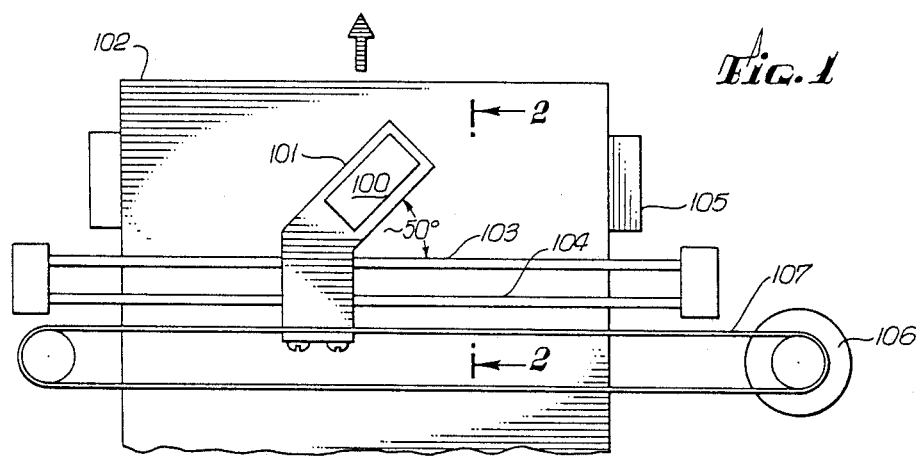
FIG. 1 is a schematic plan view of the mechanical components of the presently preferred embodiment of the invention.
Figure 2:
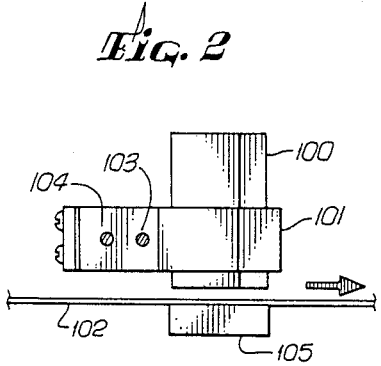
FIG. 2 is a partial cross section taken at 2—2 of FIG. 1.

Reference is first made to FIG. 1, which schematically depicts the mechanical structure of a FAX receiver according to the present invention. A printhead 100 is shown mounted on a carriage 101, the assembly being constrained to move reciprocally across a sheet of paper 102 by guide rods 103 and 104. To simplify the explanatory language used in this specification and the claims, the direction of printhead motion is called horizontal, and the orthogonal direction along the paper is called vertical. The paper sheet 102 is supported a small fixed distance away from the bottom surface of the printhead 100 by platen 105. As will be described below, the bottom surface of the printhead contains a number of nozzles through which droplets of ink are ejected. These droplets form dots on the paper sheet 102 as they are ejected. Motor 106 and belt 107, under control of a scanning control system, not shown, cause the printhead to scan back and forth across the sheet. After each scan, a sheet advance mechanism, not shown, advances the sheet in a direction perpendicular to the printhead motion. In the presently preferred embodiment of the invention the sheet advance is about 0.128 inches, and in the alternate embodiment described, the sheet advance is about 0.167 inches.

The design of the printhead 100 forms no part of this invention. It is a commercially available component manufactured by the Hewlett-Packard Company for its DeskJet printer, and is well known to those skilled in the art. Within the printhead is a relatively large ink reservoir and 50 ink ejectors which cause droplets of ink to be ejected. On the bottom surface of the printhead (the surface which faces the sheet of paper 102) are 50 ink nozzles 120-1 through 120-50. These nozzles are the passages through which the ink droplets are ejected. By firing the appropriate ejector, a droplet can be ejected from any nozzle at any time, subject, of course, to the maximum firing rate of the ejectors. By selectively ejecting droplets as the printhead scans across the sheet, any desired pattern of dots can be printed on the sheet.

Figure 3:
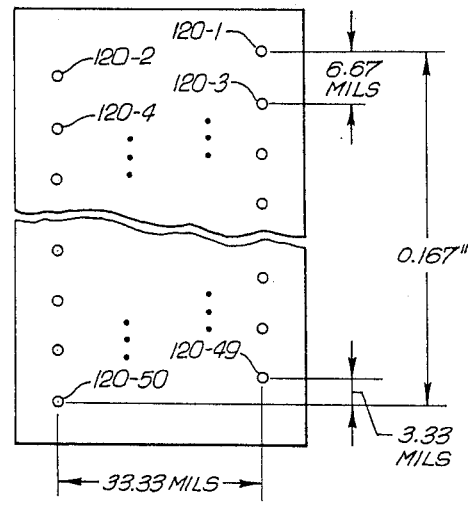
FIG. 3 is a view of the bottom surface of the printhead showing the placement of the ink jet nozzles.
Figure 5:
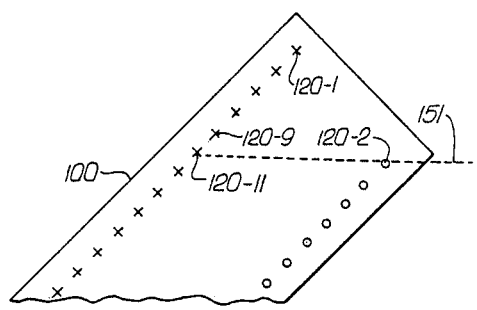
FIG. 5 is a diagrammatic representation simulating a view from inside the printhead mounted in accordance with the presently preferred embodiment of the invention looking down through the nozzles onto the paper, showing how the nozzles align in the direction of printhead motion.
Figure 6:
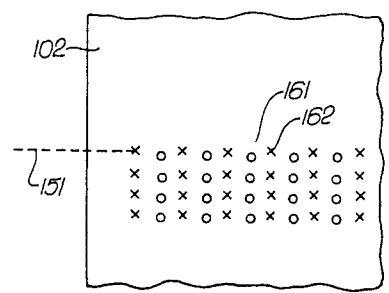
FIG. 6 is a depiction of a line four dots high as would be printed by a printhead positioned as shown in FIG. 5.

As can be seen in FIG. 3, the nozzles are arranged in two columns of 25 nozzles each, the nozzles in each column being spaced 6.67 mils vertically, and the columns spaced 33.33 mils horizontally. For convenience, the nozzles of one column have been designated by odd numbers, and the nozzles of the other column by even numbers. The nozzles in the even numbered column are offset with respect to the nozzles in the odd numbered column by one half space (3.33 mils). The nozzles are thus equally spaced in the direction of the columns. If the printhead were set square with respect to the motion of carriage 101, the dot resolution down the page would be 300 dots per inch. In the presently preferred embodiment of the invention, however, the printhead is not set square, but is turned about 50 degrees with respect to horizontal (more precisely, 50.07 degrees), causing the dots printed by the nozzles of each column to be spaced about 5.11 mils vertically. With the printhead at this angle, the dots printed by the nozzles in the even numbered columns are in substantial horizontal alignment with the dots printed by the nozzles in the odd numbered columns. The misalignment is about 1.6 mils, an amount too small to be noticeable on the printed page. As will be described later, the print logic is such that, as recorded on the paper, dots printed by nozzles in the even numbered column alternate with those printed by nozzles in the odd numbered column. This alternate dot printing is depicted by the "X" and "0" notation in FIG. 6. The dots printed by the odd numbered nozzles are denoted by an "X" and the dots printed by the even numbered nozzles by an "O". FIG. 5 shows how the printhead 100 is positioned (vertically) so as to be able to print the pattern of FIG. 6. As can be seen from the dotted line 151 (which is provided to show the alignment) the first printed line of dots on the page is printed by dots formed by nozzles 120-2 and 120-11. The reason for this will be explained below.

It will be appreciated that a certain amount of logic and memory circuitry will be required to cause the dots to be printed in their proper positions. Assume, for example, that two adjacent dots 161 and 162 (FIG. 6) are to be printed. The video signals corresponding to these dots were originally generated in sequence, but, because nozzle 120-11 which will be used to print dot 162 is physically remote from nozzle 120-2 which will be used to print dot 161, the two dots cannot be printed in sequence. In order to print these dots adjacent to one another, it is necessary to provide memory to store the print signals, and logic to retrieve the print signals when the respective nozzles are in position to print each dot. Similarly, because the printhead is slanted, the nozzles in the columns are not vertically aligned with respect to the paper thus requiring memory and logic to cause the printed dots to be vertically aligned.

Figure 4:
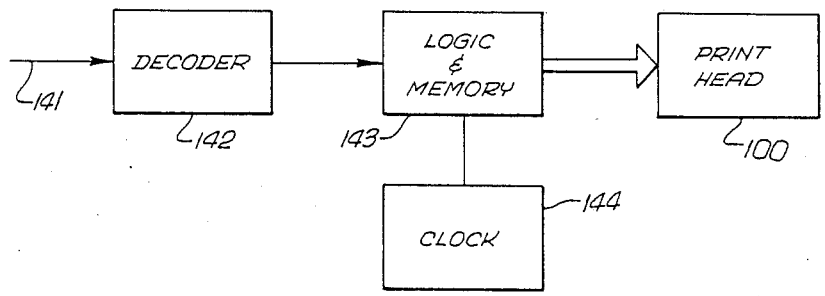
FIG. 4 is a simplified block diagram of the electronic circuitry used in connection with the present invention.

FIG. 4 is a simplified block diagram of the electronic circuitry used to create a FAX image in accordance with the present invention. A coded digital signal corresponding to an image being transmitted by a remote FAX machine is received on line 141 and fed to decoder 142 and thence to logic/memory unit 143. The logic/memory unit 143, under control of clock 144, converts the serial signal received from decoder 142 into a parallel format and drives the 50 ejectors in printhead 100. The ejectors are fired with such timing and in such sequence as to form a pattern of dots corresponding to the image scanned by the transmitting FAX machine. The logic necessary to accomplish the required functions may be implemented in a straightforward manner and is well understood by persons skilled in the art. A detailed explanation is therefore deemed unnecessary.

Referring again to FIG. 6, the first row of dots shown at the top of the figure are the dots formed by nozzles 120-2 and 120-11. The second row is formed by nozzles 120 4 and 120-13, and so on. For purposes of illustration, a horizontal line four dots high is shown being printed. Of course, in printing actual images, only those dots corresponding to dark areas are printed. Each pass of the printhead over the paper will cause a strip of the image 0.128 inches wide to be printed. The sum of all of the 0.128 inch strips generated as the printhead is repeatedly moved across the page becomes the reproduced FAX image.

Figure 7:
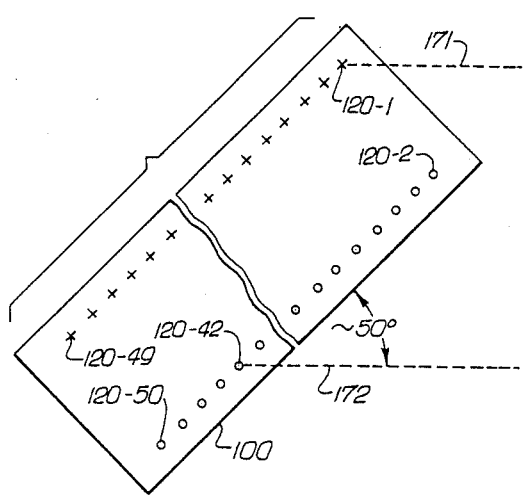
FIG. 7 diagrammatic representation similar to FIG. 5, but positioned relative to the paper as shown in FIG. 8.
Figure 8B:
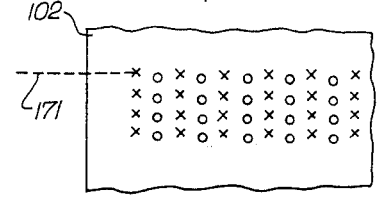
FIG. 8A shows the dots printed on a first pass of the printhead and FIG. 8B shows the completed line after the sheet has been advanced and the printhead has made a second pass across the page.
Figure 8A:
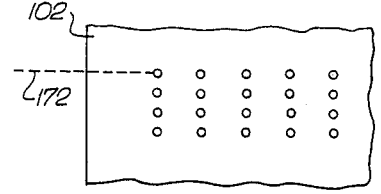

It will be noted by inspection of FIG. 5 that there are no even numbered nozzles which align (horizontally) with the odd numbered nozzles 120-1 through 120-9. For this reason, on the first pass of the printhead across the top of a page these nozzles are not used, and the first row of printing is done by nozzles 120-2 and 120-11. On the second and subsequent passes of the printhead over the paper, however, dots formed by the odd numbered nozzles 120-1 through 120-9 align with dots formed by the even numbered nozzles 120-42 through 120-50 of the previous pass, and all nozzles are used. This is illustrated in FIG. 8 which depicts a printed horizontal line similar to the line of FIG. 6. This line is formed by dots printed by nozzles 120-42 through 120-48 of the even numbered column during one pass, and nozzles 120-1 through 120 7 of the odd numbered column during the subsequent pass. Sheet 102 is advanced about 0.128 inches after every pass to achieve this alignment. FIG. 8A shows the dots formed by the even numbered nozzles on the first pass of the printhead and FIG. 8B shows the same area of the sheet after it has been indexed up 0.128 inches between passes of the printhead, and a second pass completed. To facilitate understanding, the nozzles depicted in FIGS. 5 and 7 are shown aligned with the corresponding printed rows of FIGS. 6 and 8 and reference dotted lines 151, 171 and 172 are provided to show the alignment.

The scan speed of the printhead across the page and the clock timing are set to result in a 204 dot per inch horizontal resolution. The vertical resolution, because of the 5.11 mil vertical nozzle spacing, is 195.6 dots per inch. Thus, an image having the standard CCITT Group 3 resolution of 195.6V×204H DPI (fine mode) is achieved using a printhead designed for 300×300 DPI resolution. Standard mode resolution of 97.8V×204H DPI may be achieved by not printing alternate dot rows or, if desired, by printing the same information on two adjacent rows of dots. The latter method is preferred since it creates a darker image and better matches the pel shape implicit in the CCITT Recommendation.

Figure 9A:
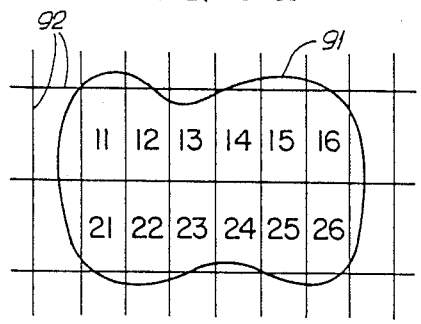
FIG. 9 shows an exemplary image used to explain the principles of the present invention.
Figure 9B:
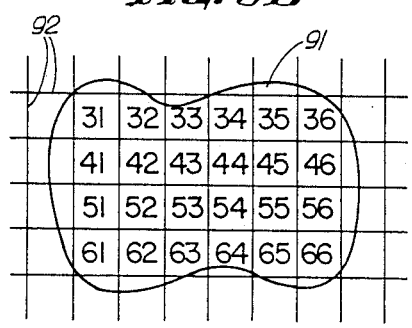

As an aid to understanding the principles of the present invention, an exemplary image consisting of a small approximately rectangular black area 91 shown in FIG. 9 will be used. A grid 92, simulating the pel boundaries when the image 91 is scanned, is shown projected on the image. FIG. 9A shows standard mode pels and FIG. 9B shows fine mode pels. The pels which represent the black areas of the scanned area are numbered to permit correlation with the dot patterns of the image as reproduced in accordance with various embodiments. For convenience, in the following explanation a row of pels will be identified by the number of the first pel in the line. That is, the row of pels 31 through 36 will be called "line 31". As can be seen, the standard mode FAX representation of image 91 is contained in two lines of information, lines 11 and 21. The fine mode representation includes four lines of information: 31, 41, 51, and 61. Each line contains six consecutive black pels preceded and followed by white pels. The numerals within each dot of the reproduced images correspond to the pel on image 91 which caused that dot to b printed.

Figure 10C:
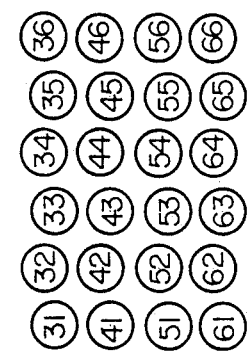
FIG. 10 shows the exemplary image of FIG. 9 printed in accordance with the presently preferred embodiment of the invention.
Figure 10B:
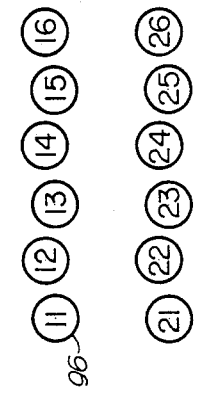
Figure 10A:
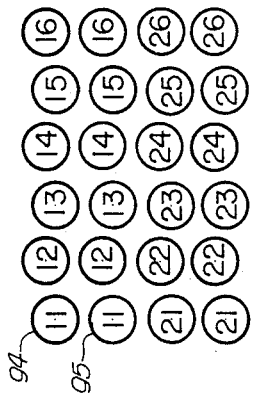

FIGS. 10A, B, and C depict the image 91 as it would appear reproduced according to the presently preferred embodiment of the invention. FIGS. 10A and B are the image reproduced in standard mode, while FIG. 10C shows the image reproduced in fine mode. In FIG. 10A, each pel is shown as printed by two vertically aligned dots. For example, pel 11 is shown as being printed by dots 94 and 95. FIG. 10B shows a second method of printing in standard mode wherein each pel is represented by one dot. In this figure pel 11 is seen as being printed by dot 96. Both images contain all of the received FAX information, but the image of FIG. 10B, because of the lower dot density, will appear grayer, and will consume less ink.

FIG. 10C shows the image 91 reproduced in fine mode according to the presently preferred embodiment of the invention. In FIG. 10C, it can be seen that each pel of image 91 is represented by one dot in the reproduced image. Again, all received FAX information is reproduced.

By turning the printhead to change the effective nozzle spacing, the presently preferred embodiment of the invention described above allows an image to be created which is in exact accordance with the CCITT compatibility standards. Since no individual nozzle needs to be fired more often than once every other dot space on the page, the speed of printing may be set at a commercially acceptable level. Printing speed is a critical item from both telephone cost and convenience points of view.

In applications where exact conformance to CCITT standards is not required, it is possible to use the Hewlett-Packard DeskJet print cartridge to print satisfactory image without turning the head. That is, the printhead is set square with the paper motion instead of being turned as shown in FIG. 1. The image obtained using this alternate approach is about 2% smaller than the original but may otherwise be a faithful copy. The resolution instead of being 97.8V×204H DPI (in standard mode) is 100V×208.6H DPI. An effective vertical resolution of 200 DPI to simulate a CCITT fine mode image is also possible.

When the printhead is set square with the paper motion instead of being slanted at about 50 degrees as previously described, the vertical resolution is determined by the spacing of the nozzles A horizontal dot spacing of 208.6 DPI is correspondingly chosen to avoid distortion of the image. The horizontal dot spacing is set by adjustment of the carriage scan speed. The dot clock rate also affects the horizontal dot spacing, but this rate is preferably set to fire the ejectors at near their maximum firing rate in order to achieve maximum speed from the system.

Figure 15A:
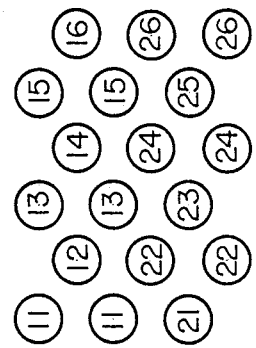
FIGS. 13, 14, and 15 depict the exemplary image of FIG. 9 as reproduced by several possible dot patterns.
Figure 15B:
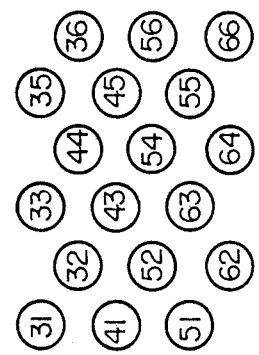
Figure 14A:
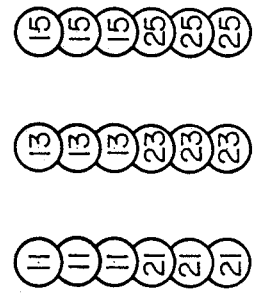
Figure 14B:
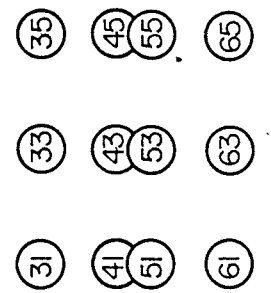
Figure 13A:
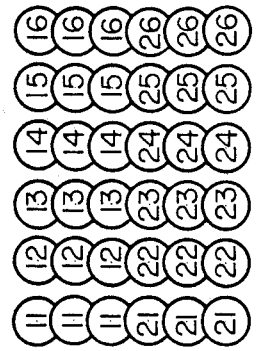
Figure 13B:
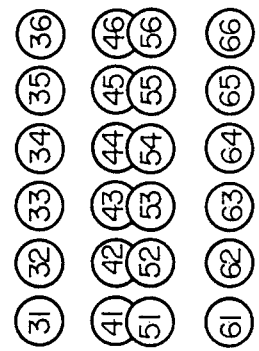

There are a number of possible dot patterns which could be used with a square mounted printhead to create approximations of an original FAX image. In general, the images created by these dot patterns suffer from one or more deficiencies which render them undesirable for use in a commercial FAX machine. Several of these patterns are illustrated in FIGS. 13, 14, and 15. FIGS. 13A, 14A, and 15A depict standard mode patterns and FIGS. 13B, 14B, and 15B depict fine mode patterns. The pattern of FIG. 13 involves the requirement that each nozzle be capable of placing dots every 5 mils along a row, and therefore this pattern will print too slowly to be commercially attractive. The patterns of FIGS. 14 and 15, because they involve skipping spaces, do not reproduce all of the FAX image detail. Print patterns which require the dot forming elements to possibly print a dot in each pel along a row, or which print dots in alternate pels along the row (or less often) will suffer from one or the other of the deficiencies described above and are thus not desirable.

Figure 11B:
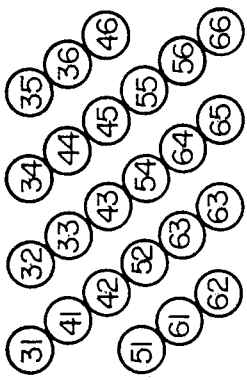
FIG. 11 shows the exemplary image of FIG. 9 printed in accordance with an alternate embodiment of the invention.
Figure 11A:
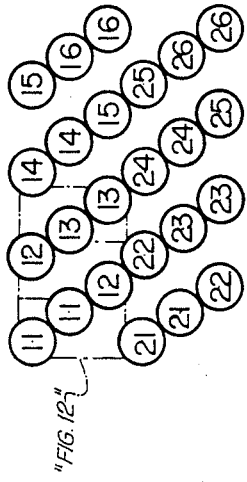

FIG. 11 illustrates an image created with an alternate embodiment of the invention which utilizes a printhead set square with the paper motion, but which does not suffer from the problems associated with the patterns described in the previous paragraph. The mechanical arrangement used in this embodiment is the same as illustrated in FIG. 1 except that the printhead 100 is set square with the paper motion instead of being turned as shown in FIG. 1.

The minimum horizontal distance between ejector firings in this embodiment is greater than one pel width, allowing the speed of operation to be increased sufficiently to be commercially acceptable. The dot density of the pattern is such that all of the received FAX information is printed and full image detail is retained. The dot density in standard mode is two dots per pel, and in fine mode, one dot per pel. For the pattern shown in FIG. 11, the clock rate/scan rate ratio is set so as to create two dot locations per pel. The pattern is such, however, that no individual ejector need be fired (and a dot printed) more often than once every three dot locations, i.e., once every 1.5 pel widths. In other words, while the image picture elements have a horizontal resolution of 200 pels per inch, the horizontal dot grid is set to be 400 dots per inch, with no nozzle required to place a dot more often than every third horizontal grid space. Each nozzle of the triad of nozzles associated with a row of standard mode pels prints its dots in a different horizontal dot grid space. In this way, each successive pel in a black area of the image will contain two dots printed by a different pair of nozzles of the triad associated with that row of pels. The pattern repeats module three.

Figure 12:
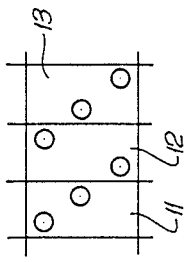
FIG. 12 depicts the placement of the printed dots of FIG. 11 with respect to pels 11, 12, and 13 of the original image as shown in FIG. 9A. The figure shows the outlines of pels 11, 12, and 13 of FIG. 9A projected on the region as indicated on FIG. 11A.

The printing scheme illustrated in the embodiment of FIG. 11 can be more easily understood from an inspection of FIG. 12, which depicts one repeat of the pattern of dots which make up a standard mode image. FIG. 12 depicts pels 11, 12, and 13 with the corresponding dots of the reproduced image superimposed. The dots are shown relatively small to accentuate their relative locations within the pel. Pel 11 in FIG. 12 is seen to be comprised of dots from dot rows 1 and 2, pel 12 is comprised of dots from dot rows 3 and 1, and pel 13 is comprised of dots from dot rows 2 and 3. This repeating pattern includes two dots per pel. Since the distance between dots in any row is at least about 7.5 mils, the scan speed of the printhead can be made high enough to result in an acceptably fast print speed, yet the dot density is high enough to result in a suitably dark image.

FIG. 11B, which depicts the fine mode pattern associated with the embodiment of FIG. 11, can be seen to include one dot for each pel of FIG. 9B. Thus, each bit of received FAX information is printed, and no image detail is lost.

While the invention has been described in connection with printing facsimile images, it will be realized by those of ordinary skill in the art that the principles disclosed herein can readily be applied to other applications wherein it is desired to print images with dot spacings other than the spacing built into the printhead. Such applications, and other applications of the invention as defined by the following claims, are intended to be covered thereby.

We claim:

1. A method for printing an image which comprises the steps of:
   receiving electrical signals representative of an image to be printed;
   converting said electrical signals into signals for driving dot forming elements of a printhead;
   mounting a printhead for reciprocal motion across a sheet, said printhead having a plurality of dot forming elements arranged in two parallel columns, said dot forming elements in each column being equally spaced, said printhead being mounted whereby said columns make an acute angle with respect to the direction of said reciprocal motion, at least some of the dot forming elements in one of said columns being substantially aligned in the direction of said reciprocal motion with dot forming elements in the other of said columns, the aligned dot forming elements being spaced in the direction of said columns a distance greater than the spacing between dot forming elements in said columns;
   providing a clock signal;
   causing relative motion between said printhead and said sheet; and
   feeding said converted electrical signals to said dot forming elements under control of said clock signal whereby rows of dots corresponding to the image to be printed will be formed on said sheet at dot locations within an imaginary array of pel areas on said sheet, each pel area corresponding to the location of a picture element on the image to be printed, and each pel area containing at least one dot location, the relationship between said clock signal, said converted electrical signals, and said relative motion being such that the minimum spacing between any two dots printed by the same dot forming element is greater than the width of one pel.

2. the method recited in claim 1 wherein there are two columns of dot forming elements and wherein said offset is equal to one half of the spacing between dot forming elements.

3. The method recited in claim 2 wherein the spacing between dot forming elements is about 6.67 mils, the spacing between columns is about 33,33 mils, and said printhead is mounted such that said columns make an angle of about 50 degrees with respect to the direction of said reciprocal motion.

4. A facsimile receiver which comprises:
   means for receiving and decoding facsimile signals;
   means for converting received and decoded facsimile signals into signals for driving dot forming elements;
   a printhead mounted for reciprocal motion, said printhead having a plurality of dot forming elements arranged in two columns, said columns making an acute angle with respect to the direction of said reciprocal motion, at least some of the dot forming elements in one of said columns being substantially aligned in the direction of said reciprocal motion with dot forming elements in the other of said columns, the aligned dot forming elements being spaced in the direction of said columns a distance greater than the spacing between dot forming elements in said columns;

means for imparting reciprocal motion to said printhead;

means for supporting a sheet of paper in close proximity to said dot forming elements; and means for causing successive dots in each printed horizontal line segment to be printed by the dot forming elements of said two columns alternately.

5. A method for printing an image which comprises the steps of:

receiving electrical signals representative of variations in color density of pels along scan lines of an image to be printed;

converting said electrical signals into signals for driving dot forming elements of a printhead;

mounting a printhead for reciprocal motion relative to a sheet, said printhead having a plurality of dot forming elements arranged in one or more parallel columns, said dot forming elements being equally spaced in the direction of said columns;

providing a clock signal;

causing relative motion between said printhead and said sheet; and feeding said converted electrical signals to said dot forming elements under control of said clock signal whereby rows of dots corresponding to the image to be printed will be formed on said sheet at dot locations within an imaginary array of pel areas on said sheet, each pel area corresponding to the location of a picture element on the image to be printed, and each pel area containing at least one dot location, the relationship between said clock signal, said converted electrical signals, and said relative motion being such that the minimum spacing between any two dots printed by the same dot forming element is greater than the width of one pel, the printed pels along each scan line of said image being printed by dots formed by three of said dot forming elements, each dark colored pel including two dots formed by two of said three dot forming elements, no two adjacent pels having dots formed by the same group of two dot forming elements.

6. The method recited in claim 5 wherein the minimum spacing between any two dots printed by the same dot forming element is equal to 1.5 pel widths.

7. A method for printing an image which comprises the steps of:

receiving electrical signals representative of an image to be printed;

converting said electrical signals into signals for driving dot forming elements of a printhead;

mounting a printhead for reciprocal motion relative to a sheet, said printhead having a plurality of dot forming elements arranged in one or more parallel columns, said dot forming elements being equally spaced in the direction of said columns;

providing a clock signal;

causing relative motion between said printhead and said sheet; and feeding said converted electrical signals to said dot forming elements under control of said clock signal whereby rows of dots corresponding to the image to be printed will be formed on said sheet at dot locations within an imaginary array of pel areas on said sheet, each pel area corresponding the image to be printed, and each pel area containing at least one dot location, said dot forming elements being divided into groups of three dot forming elements, the method being further limited in that no dot formed by any dot forming element is vertically aligned with a dot formed by either of the other dot forming elements in the same group of three, the relationship between said clock signal, said converted electrical signals, and said relative motion being such that the minimum spacing between any two dots printed by the same dot forming element is greater than the width of one pel.

8. The method recited in claim 7 wherein in areas of said image where all three dot forming elements of a group print dots, the horizontal spacing between successive dots formed by the dot forming elements of said group equals one half of a pel width.

9. A printhead assembly for printing dot matrix images which comprises:

a carriage mounted for reciprocal motion;

a printhead mounted on said carriage, said printhead having a plurality of dot forming elements arranged in two columns, said columns making an acute angle with respect to the direction of said reciprocal motion, at least some of the dot forming elements in one of said columns being substantially aligned in the direction of said reciprocal motion with dot forming elements in the second of said columns, the aligned dot forming elements being spaced in the direction of said columns a distance greater than the spacing between dot forming elements in said columns; and means for imparting reciprocal motion to said printhead.

* * * * *